United States Patent [19]

Kaim

[11] Patent Number: 5,368,324
[45] Date of Patent: Nov. 29, 1994

[54] MOUNTING SYSTEM FOR FIFTH WHEELS

[75] Inventor: John W. Kaim, Chicago, Ill.

[73] Assignee: AMSTED Industries Incorporated, Chicago, Ill.

[21] Appl. No.: 179,270

[22] Filed: Jan. 10, 1994

[51] Int. Cl.$^5$ ............................................. B62D 53/08
[52] U.S. Cl. .................................. 280/438.1; 403/387
[58] Field of Search ................... 280/433, 438.1, 439, 280/440, 441; 296/29, 30; 403/384, 386, 387

[56] References Cited

U.S. PATENT DOCUMENTS

| 2,900,194 | 8/1959 | De Lay | 280/34 |
| 3,598,427 | 8/1971 | Lavery | 280/433 |
| 3,729,214 | 4/1973 | Mulcahy et al. | 280/407 |
| 3,843,159 | 10/1974 | Hood, II | 280/407 |
| 4,762,334 | 8/1988 | Altherr | 280/433 |
| 5,203,850 | 4/1993 | Harrold | 280/433 |

FOREIGN PATENT DOCUMENTS 2049713  7/1992  Canada ................. 280/433

Primary Examiner—Mitchell J. Hill
Assistant Examiner—Kevin Hurley
Attorney, Agent, or Firm—Edward J. Brosius; F. S. Gergorczyk; Thomas J. Schab

[57] ABSTRACT

Truck tractors are connected to their trailers by fifth wheels and several companies manufacture fifth wheel assemblies. The tractors consist of a pair of longitudinally extending beams or rails to which the fifth wheel assemblies mount. Each fifth wheel manufacturer provides several types of fifth wheels, depending upon the type of trucking service being provided. Complicating the situation is the fact that the lateral spacing between the beams will differ. As a result of these variations, different types of mounting brackets have been developed to secure the fifth wheels to the trailer frames. The drop-over bracket fifth wheel mounting assembly consists of an L-shaped angle brace which complements and is slipped over the beam of the tractor; a bracket on its top connects to the fifth wheel. The flat plate method utilizes a thick, flat plate to span across and rest upon each of the beams; it also has a top side bracket. The drop-over method resists longitudinal loads very well but has been found to develop fatigue cracks as a result of lateral and lateral overturn loads. The flat plate method has proved to be a more costly, yet more effective method of preventing fatigue cracking. The present invention combines the positive features of each individual system into a single, and unitary lightweight cast mounting assembly, thereby providing structural homogeneousity which is resistant to fatigue cracking. Since the combined bracket mounts directly to the tractor beams, it can be used from tractor to tractor if necessary, with no concern for the lateral spacing between the beams of a particular tractor.

12 Claims, 3 Drawing Sheets

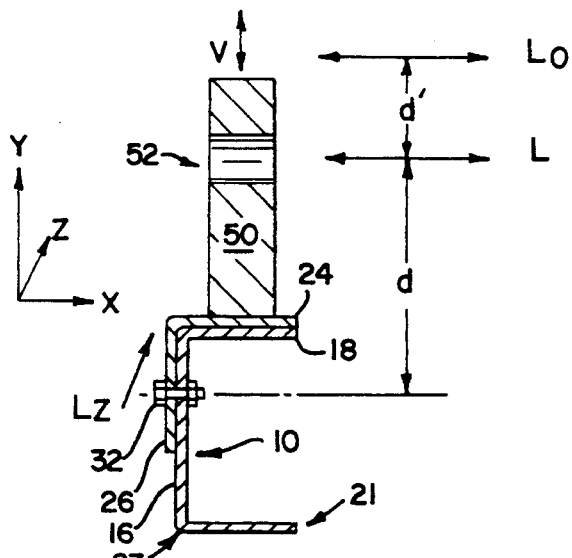
FIG. 4
PRIOR ART
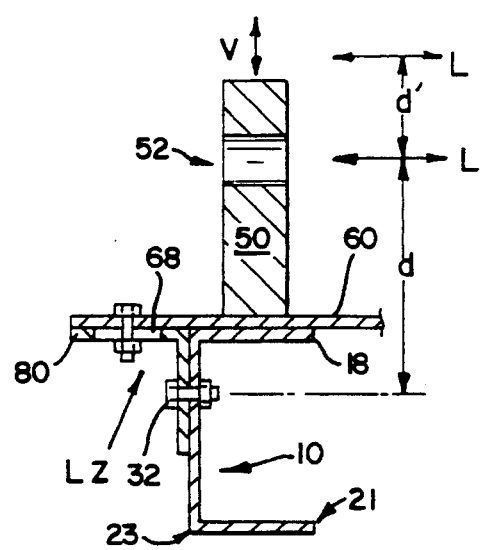
FIG. 5
PRIOR ART
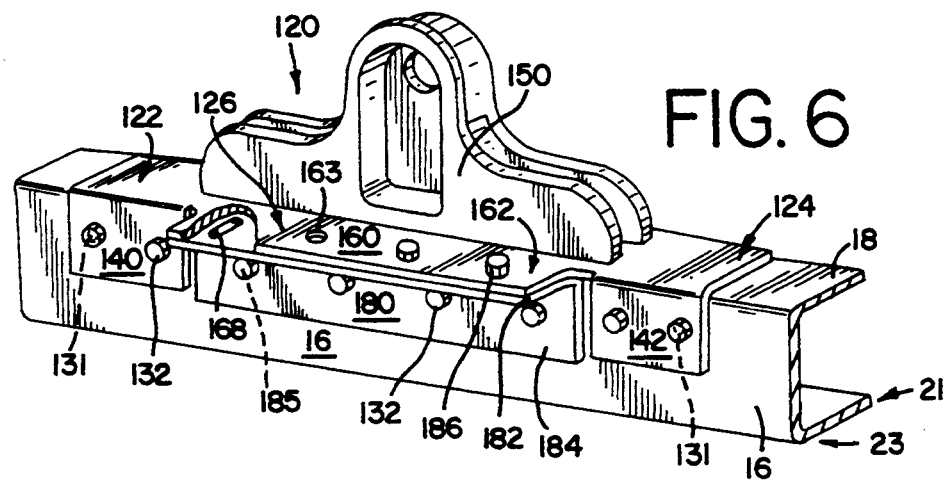
FIG. 6
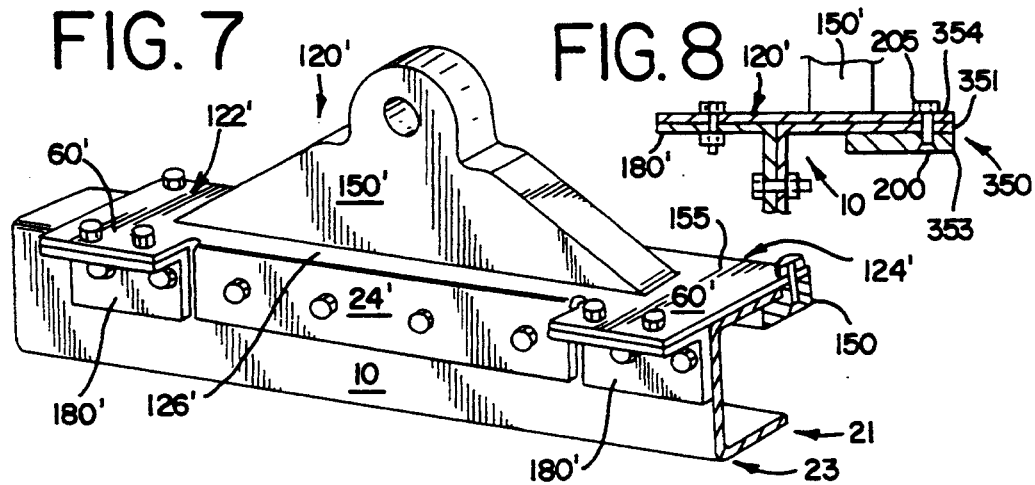
FIG. 7
FIG. 8

MOUNTING SYSTEM FOR FIFTH WHEELS

FIELD OF THE INVENTION

The present invention relates to fifth wheels which are demountably connected to truck tractors, and more particularly, to an improved mounting structure for securing the fifth wheel to the tractor frame.

BACKGROUND OF THE INVENTION

Tractor frames, to which the fifth wheels are mounted, typically comprise a pair of longitudinally extending C-shaped channel members that are supported by the wheel and axle assemblies. The channels are laterally spaced apart from each other and they provide a planar surface for resisting normal and twisting forces after the fifth wheel is secured thereupon and placed in operation, thereby transferring the payload of the trailer equally into each of the frame channels. In super heavy service applications, each of the channel members may even be comprised of double or stacked C-shaped channels. The fifth wheel can be mounted to the truck frame in a number of various ways, but for the sake of this discussion, only the fifth wheels which indirectly mount to the channels through use of drop-over angle brackets or flat mounting plates will be discussed.

The drop-over method utilizes an L-shaped angle member which conforms and communicates with the top and vertical legs of each of the channels, having its vertical leg bolted to the outboard vertical side of the channel. The horizontal leg of the drop-over bracket, which coexists with the top horizontal leg of the channel, also includes an arcuately shaped mounting bracket which is welded thereupon. The arcuate mounting bracket lies generally above the top horizontal leg of the C-shaped channel and the exact location is a function of the variation of the width of the channel horizontal leg and the lateral spacing between the channels of the tractor frame, as will become clearer later in the discussion. The arcuate mounting bracket includes a horizontally aligned throughbore for accepting a coupling crosspin which is in communication with the fifth wheel framework. More specifically, the fifth wheel framework has a flange on one or each peripheral edge that communicates with the arcuate mounting bracket. In this way, flange ports on each flange can be horizontally aligned with the mounting bracket throughbore for pinning the fifth wheel to the drop over angle mounting bracket and hence, to the tractor frame. Although the drop-over brackets transmit lateral inertial forces which are caused by curving and rocking of the fifth wheel into the frame, drop-over arrangements are best suited for resisting longitudinal forces and moments caused from acceleration, deceleration, as well as the downward forces acting on the ramp's eccentric, to the rear of the bracket pivot center during coupling. In any event, the lateral and longitudinal forces will produce high magnitude lifting forces between the bracket and the tractor frame and as a result, localized forces have developed fatigue cracks either directly beneath the arcuate mounting bracket near the weld line, or between the bolt holes.

Another type of anchoring assembly is the flat plate mounting assembly, and it offers increased fatigue cracking strength compared to the drop-over bracket method during the lateral and lateral overturn loads, while being as effective in resisting vertical loads, The flat mounting plate assembly consists of a rectangular, planar plate of steel which is secured flatly on top of each of the tractor channels, with the lateral sides of the plate extending slightly beyond each channel. In order to transfer loads from the plate into the frame, a section of L-shaped angle is used to support the plate directly below the overhang. Those in the art typically refer to this angle as the outboard angle member. The outboard angle member is simultaneously secured to the tractor channel and the flat mounting plate by bolting its horizontal leg to the bottom side of the mounting plate and then bolting its vertical leg to the vertical wall of the channel. The same arcuate mounting brackets used in the drop-over mounting assembly are welded to the top of the mounting plate and they are generally located above the top horizontal leg of the C-shaped channel: their relation to the frame again being a function of the channel width and the lateral spacing between the track channel members. The location of the arcuate mounting bracket, with respect to the horizontal leg of the channel member, does not depend upon which assembly is used.

The flat mounting plate method of attachment offers increased fatigue strength when compared to the drop-over mounting assembly because the lateral forces and moments which work upon the arcuate mounting bracket are first distributed throughout the entire flat plate surface area before they are distributed and transferred into the outboard angle member. This arrangement offers greater surface area for load distribution, thereby decreasing the magnitude of stresses being transferred into each attachment bolt and into the critical areas between the anchoring bolts. However, one disadvantage of the fiat mounting plate arrangement is that it utilizes a large, thick steel plate which adds cost and weight to the mounting arrangement, as well as extra time and labor for assembling it to the tractor frame.

SUMMARY OF THE PRESENT INVENTION

By the present invention, it is proposed to provide a simple and economical fifth wheel mounting arrangement which serves to transmit both the lateral and longitudinal loads effectively into the vertical and horizontal webs of the tractor frame members.

It is another object of the present invention to provide a lightweight fifth wheel mounting arrangement which incorporates the features of a fiat mounting plate for increased strength during lateral and lateral overturn loads.

It is another object of the present invention to provide a lightweight fifth wheel mounting arrangement which incorporates the features of the drop-over angle bracket for resisting longitudinal and coupling loads.

It is a final object of the present invention to provide an integrally-formed, lightweight mounting arrangement which is constructed as a combination of two mounting methods into a single, unitary cast system with at least pan of the mounting assembly formed as a drop-over angle bracket, while the other pan is formed as a flat mounting plate. In this way, when the combined mounting system is secured to the tractor frame, the weaknesses of each of the individual mounting arrangements, when operated separately, can be overcome. This means that the fatigue cracking problems normally found in the drop-over mounting systems can be eliminated while a less costly method of manufacture is employed.

BRIEF DESCRIPTION OF THE DRAWINGS

FIG. 4 is a cross-sectional view of a drop-over bracket mounting arrangement showing the various forces acting on the system;

FIG. 5 is a cross-sectional view of a flat plate mounting arrangement showing the various forces acting on the system;

FIG. 6 is a perspective view of the preferred embodiment of the fifth wheel mounting bracket arrangement of the present invention;

FIG. 7 is a perspective view of another embodiment of the fifth wheel mounting bracket arrangement of the present invention:

FIG. 8 is cross-sectional view taken along line 8—8 in FIG. 7 showing an optional additional anchoring method for either of the embodiments of the present invention.

DESCRIPTION OF THE PREFERRED EMBODIMENT

Figure 2A:
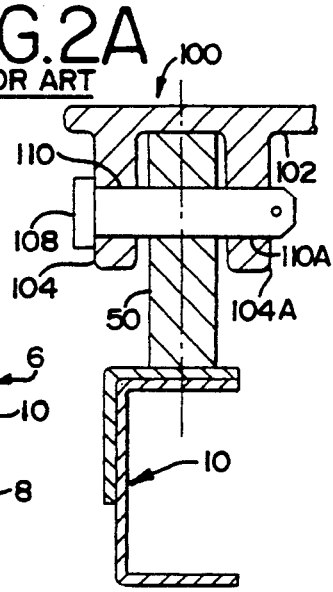
FIG. 2a is a partial cross-sectional view through a dual flanged fifth wheel plate.
Figure 2:
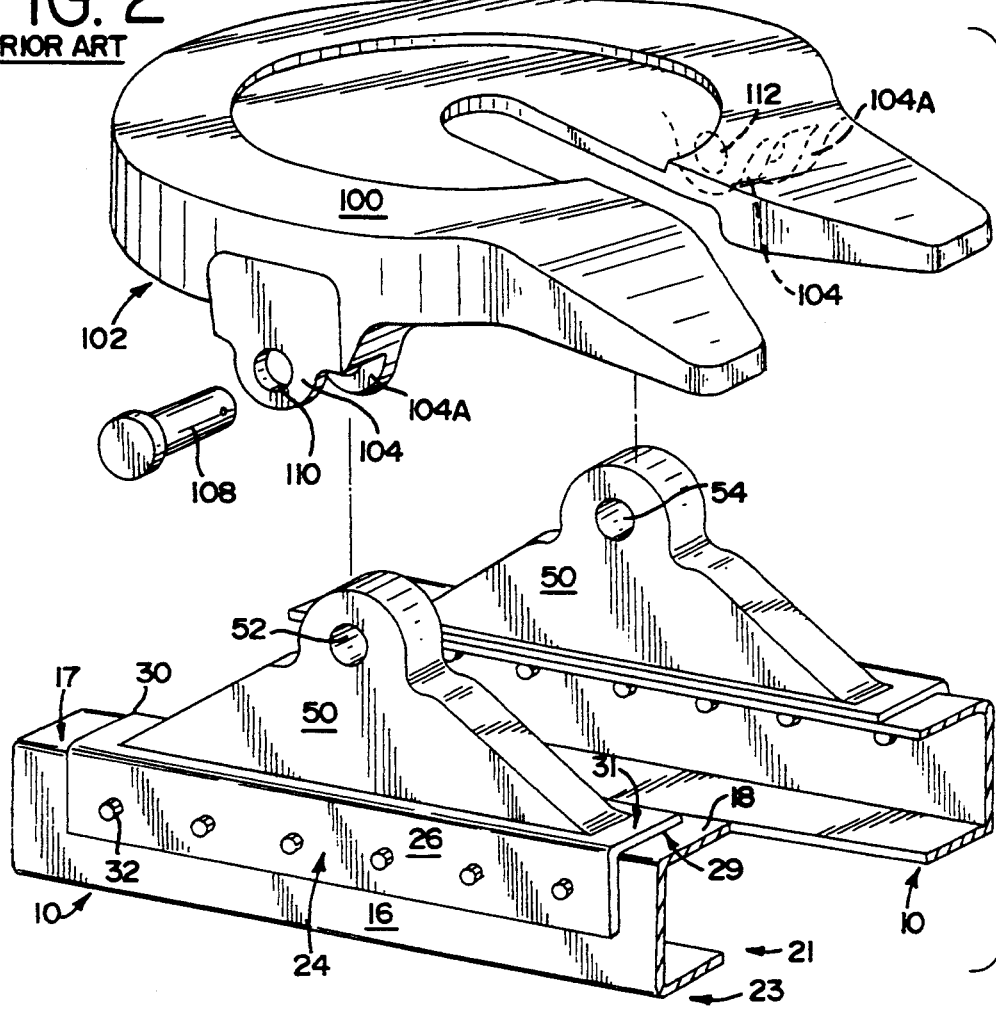
FIG. 2 is a perspective view of a drop-over bracket mounting arrangement.
Figure 3:
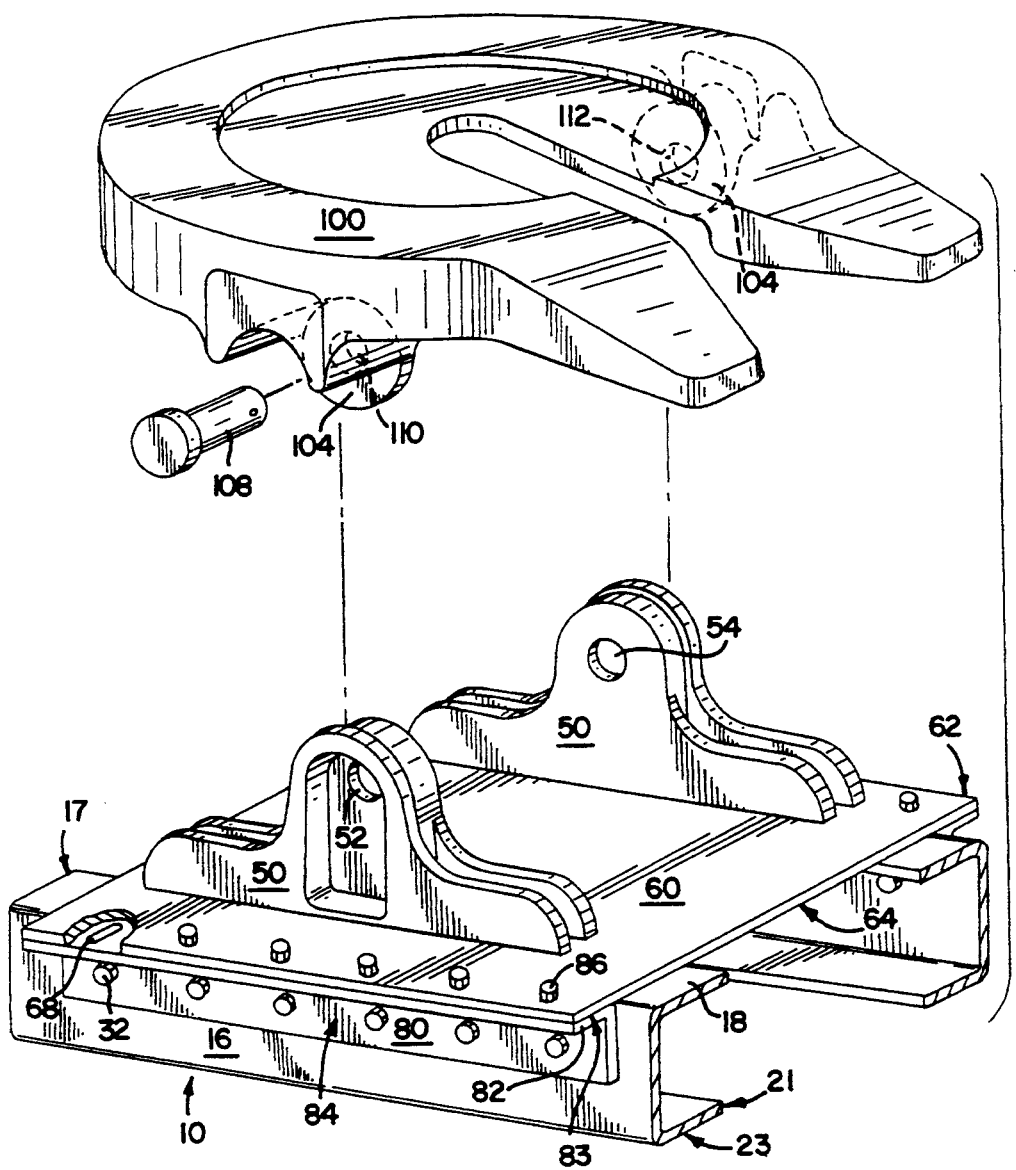
FIG. 3 is an perspective view of a flat plate mounting arrangement.

Those in the art are familiar with the drop-over angle bracket and flat plate fifth wheel mounting arrangements, however, each of these arrangements is respectfully illustrated in FIGS. 2 and 3 so that the features and operations of each of these prior art mounting assemblies can be explained in greater detail as an aid to understanding the present invention.

Figure 1:
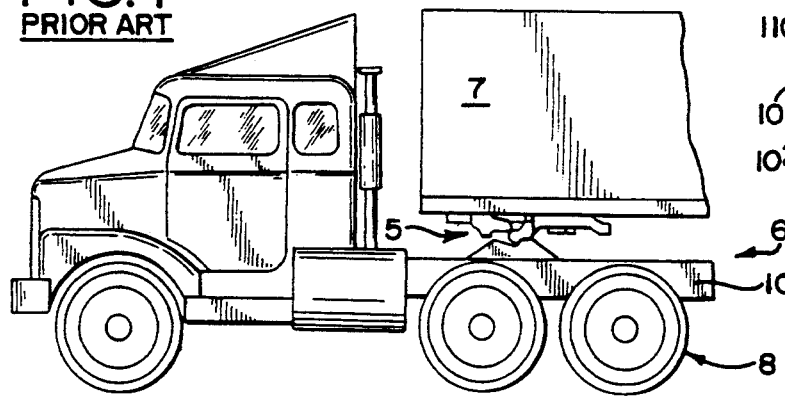
FIG. 1 is a side view of a tractor showing a fifth wheel mounting arrangement.

Referring first to FIG. 1, there is shown a tractor with a fifth wheel bracket mounting arrangement 5 generally mounted to tractor frame 6 and supporting trailer 7. Tractor frame 6 typically comprises a pair longitudinally extending C-shaped channel members 10 which are transversely spaced from each other and are supported by the suspension, wheel, and axle assemblies 8. The spacing between channels is not standardized in the trucking industry, therefore, tractor frame channel members 10 typically can be spaced apart from each other anywhere from 31.5 inches to 36.0 inches, the distance being measured from the outboard terminal edges of the individual channel members.

Referring now to FIG. 2, a drop-over angle bracket mounting arrangement is illustrated in which an L-shaped section of angle 24 is literally "dropped" over or onto each of the C-shaped channels 10 and then bolted to the vertical web 16 of channel 10 through the series of horizontal bolts 32. As seen, drop over bracket 24 consists of vertical leg 26 extending longitudinally along a length of vertical web 16, and horizontal leg 30 resting on top horizontal flange 18 such that inside surface 29 communicates with outside horizontal top flange surface 17. Horizontal leg 30 is substantially co-extensive with top horizontal flange 18 of channel member 10, while vertical leg 26 extends down vertical web 16. An arcuate mounting bracket 50 is welded to the drop-over bracket horizontal leg outside surface 31 for securing the tractor frame to the fifth wheel 100. Bracket 50 is secured to fifth wheel 100 by pivotally mounting it to a pair of diametrically opposed fifth wheel clevises or flanges 104 and 104A, that downwardly extend from the lower surface 102 of fifth wheel 100. Each flange 104,104A has a respective flange port 110 and 110A, which is in horizontal alignment with respect to each other as well as with arcuate mounting bracket apertures 52,54. Referring to FIG. 2A, it is seen that arcuate mounting bracket 50 is interposed between the fifth wheel flanges 104 and 104A, and that cross pin 108 passes through the flange ports and bracket apertures to pivotally secure the fifth wheel to the mounting bracket. The cross pin 108 accepts a heavy duty clip (not show) on the pin shank to prevent the pin from pulling out during operation.

For the purposes of this discussion, it is important to understand that with the drop-over bracket assembly 24, the arcuate mounting bracket 50 can be interchanged for use with a single flanged fifth wheel, as shown in FIG. 3. In that illustration, it is seen that a recess 90 extends across diametrically opposed locations on the base of the fifth wheel, each recess terminating at a respective single, inboard flange 104. When the fifth wheel is assembled to the arcuate mounting bracket, the top surface 49 of bracket 50 is in articulated connection with corresponding fifth wheel surface 98 such that each flange 104 is pivotally connected to the mounting bracket by passing cross pin 108 through respective flange ports 110 and bracket apertures 52,54. The peripheral lip 51 on the outboard edge of each mounting bracket 50 retains the fifth wheel against movement in the lateral direction.

With either type of mounting bracket 50, the inboard and outboard position of arcuate bracket 50 respective to top horizontal flange 18 will depend upon the spacing between the tractor channel members 10 since all fifth wheels are not manufactured to an industry standard between flange ports 110,112. For example, if a narrow tractor frame is utilized, the mounting bracket 50 will be positioned more directly above vertical web 16 and closer to outboard terminal edge 23. Likewise, bracket 50 will be closer to inboard terminal edge 21 if a wider channel spacing is utilized.

Upon inspection of FIG. 3, a prior art fifth wheel flat mounting plate assembly is shown in conjunction with the single flanged fifth wheel previously mentioned, although the dual flanged bracket can also be used. With this design, a planar, rectangular mounting plate 60, having upper surface 62 and lower surface 64, transverses each of the tractor channel members 10 and rests upon each of the channel member top horizontal flange surfaces 17. As seen, mounting plate 60 also extends slightly beyond each of the frame vertical webs 16 and this overhang or extension functions to distribute forces into the channel members, as will be explained shortly. Lower surface 64 is indirectly secured to each channel member 10 through use of an outboard angle member 80. The outboard angle member 80 is identical for each channel member and is comprised of a horizontal leg 82 which provides a planar and co-extensive support surface 83 for the over-hang of flat mounting plate 60. As illustrated, plate 60 is fastened to angle member horizontal leg 82, as by bolts 86, and as seen from the cut-away, horizontal leg 82 has slotted bolt holes 68 in order to accommodate varying tractor frame spacings. Vertical leg 84 is similarly fastened to channel member vertical web 16 by bolts 32. Arcuate mounting bracket 50 is attached to top surface 62 preferably by welding and is longitudinally centered on flat plate 60. As previously explained with the drop-over mounting arrangement, arcuate bracket 50 is either pivotally connected to a single or dual flanged fifth wheel and further detail will not be necessary.

In road operation, it has been discovered that each of the prior art mounting arrangements are well suited for specific loading applications unique to their type of design. In the drop-over arrangement shown in FIG. 2, it is known that drop-over brackets 24 best provide resistance to longitudinal and coupling loads. These loading forces tend to act upon the mounting brackets in the longitudinal direction along the length of the tractor channels, either during the coupling operation or during acceleration and deceleration over the road hauling. This is best understood by referring to FIG. 4, where it is seen that any longitudinal loading "$L_z$", acting along the channel and on arcuate bracket 56, will be directly resisted by each of the mounting bolts 32. Although each bolt is exposed to shearing forces, the series of bolts distribute the forces into vertical web 16 for excellent force distribution into channel 10. The drop-over bracket arrangement also offers resistance to vertical loading "V" since the forces pushing either up or down on the mounting bracket 50 are typically transferred from the bracket down into vertical web 16. It should be understood that vertical loads will not be transferred directly downward into the vertical member 16 if the wider tractor frame spacing is used since the bracket will be located more towards the inboard terminal edge 21 of top horizontal flange 18. In that case, the series of bolts 32 will experience shear and bending loading. However, it has been found that drop-over brackets 24 can potentially develop fatigue cracks on the vertical leg 26, usually in the area just above or in between the bolt holes from lateral or lateral overturn loads. Lateral loads "L" are those which transversely push against the arcuate mounting bracket before they are transferred into channel member 10. Lateral over-turn loads "$L_o$" are those forces which also transversely work against mounting bracket 50 but at a fixed vertical distance from the trailer frame channel members 10. As seen from FIG. 4, lateral loads "L" transversely act against the bracket creating bending moments which are a distance d from the series of mounting bolts 32. The bending moments are equally resisted by each of the bolts 32. When the distance "d" is increased an incremental amount "d'" above the bracket, as with lateral overturn loads "$L_o$", the bending moments are likewise increased. In either case, the drop-over bracket will begin to flex in the area just above or between the bolts 32, thereby causing flexure stresses that can lead to fatigue cracking.

The planar or flat mounting plate assembly 60, shown in FIGS. 3 and 5, offers increased strength to lateral and lateral over-turn loads because the forces acting upon arcuate mounting bracket 50 are more effectively distributed throughout a larger surface area before they are transmitted into the support angle members 80 and each individual mounting bolt 32. By distributing the forces from the mounting bracket into the surface area of the plate, the magnitude of stresses acting upon the outboard angle member is greatly reduced. However, flat mounting plate assembly has the disadvantage of making assembly to the tractor frame more time consuming and costly since it is much larger and heavier than the drop-over bracket assemblies.

In accordance with the present invention, the advantages of each of the prior art mounting arrangements have been uniquely incorporated into a lightweight, unitary device, seen in FIG. 6. However, before proceeding with a detailed description of that device, it is necessary to explain that the present invention has been designed with the parameters that the fifth wheel 100 is designed for handling a 70,000 lbs static vertical load, and a 200,000 lbs trailing load. This means that 35,000 lbs of load will be present at each arcuate mounting bracket 150. Furthermore, the length of unitary member 120 has been set at 36 inches. This particular length is the most common length used in the industry although mounting structure lengths for other mounting bracket assemblies have been known to be as long as 52 inches. Only under very exact and specific circumstances has the mounting structure length ever been below 36 inches. In addition, the thickness of all plate and angle members is ⅜ inches thick, which is the recommended thickness for use with a 70,000 lb fifth wheel as stated in the Maintenance Practices Manual of the Truck Maintenance Council; this is not an actual standard. It is known to those in the field that fifth wheels with ratings of 40,000 lbs and 100,000 lbs are also commonly used. Accordingly, dimensional parameters of the plate thicknesses and mounting structure lengths can vary according to the fifth wheel load ratings.

In the preferred embodiment of the fifth wheel mounting bracket assembly of the present invention, shown in FIG. 6, it is seen that the mounting assembly generally includes a unitary mounting member 120 having a forward end section 122, a rearward end section 124, and a midsection 126, each section integrally connected together. An arcuate mounting bracket 150 is preferably integrally formed as part of the midsection, although it can be a separate component later welded to the midsection. It should be understood that the present invention is not limited to only the single flange arcuate mounting bracket 150 illustrated in FIG. 6; it can also utilize the dual flanged arcuate bracket 150' shown in FIG. 7. The preferred embodiment is cast as a single, unitary member so that the assembly will not require any fabrication time and attention, thereby saving manufacturing costs, although mounting member 120 and 120' can be fabricated without sacrificing performance.

As FIG. 6 illustrates, the forward and rearward ends 122,124 are formed as drop over brackets 140,142, while the midsection 126 consists of a horizontally disposed planar mounting plate 160 interposed between and integral with each of said forward and rearward drop-over brackets 140,142. An outboard support angle member 180 is simultaneously attached to the underside 164 of planar section 160 and to vertical web 16, thereby providing a transfer mechanism for stresses acting upon section 160 to reach channel member 10.

The unitary member 120 is secured to each of the channel members 10 by first slipping or dropping the forward and rearward ends 122,124 over the top horizontal flange 18. Bolt holes 131 in each end must align with predrilled holes in channel member 10 so that bolts 132 can be inserted therethrough. Appropriate nuts and lock washers are used with bolts 132 to draw member 120 tight against channel 10. If predrilled holes in the vertical leg 16 are not provided, the holes can be drilled after unitary member 120 is positioned over channel 10. When this is completed, it is seen that arcuate mounting bracket 150 lies generally above top horizontal flange 18. The bolt holes 185 in angle member 180 can be predrilled or marked for drilling once top surface 162 of plate 160 is leveled. Bolts 132 are also used to secure midsection 126 to vertical web 16. Slotted bolt holes 168 in the horizontal leg 182 are used to align angle support member 180 with the bolt holes 163 in the flat plate section 160. Bolts 186 are used to loosely hold the support member to unitary member 120 until bolt holes 185 on vertical leg 184 can be aligned with corresponding holes in the channel member. Once bolts 132 are inserted in holes 185 and plate 160 is leveled. bolts 186 and bolts 132 can be fully tightened in order to secure midsection 126 to channel 10. The drop-over brackets 140,142 and the flat plate 160 can be predrilled before assembly is started.

With the unitary members 120 thus anchored to channel member 10, and brackets 150 so aligned, bending and twisting of the tractor frame is minimized by assuring that any vertical loads imposed thereon are maintained in close proximity to, or directly over vertical web 16 of channel 10. Keeping the loads as close to the channel vertical web and distributing them through the large surface area of the vertical web contributes to the strength and reliability of the mounting system by minimizing bending moments. Similarly, the affects of the bending moments lateral and lateral over-turn loads are also minimized by assuring that any such bending moments imposed thereon are first distributed through the thick, arcuate mounting bracket 150, then along the bracket's extended base, into fiat plate 160, where the entire support angle member 180 receives the same bending moments. Since plate 160 has a substantial longitudinal extent, the bending moments are well distributed into the entire support angle vertical leg 184, bolts 185, and vertical web 16. Test results shown in the table below indicate that substantial stress reductions can be achieved with the present invention, especially in the lateral and vertical loading directions. In those respective directions, it is seen that stresses were reduced by about 92 and 65 percent, respectfully. Even the longitudinal stresses were reduced by about 20%. However, it is important to understand that these results are only applicable to a fifth wheel rated for a 70,000 lb load and where the mounting assembly is 36 inches long, and which utilizes ⅜ inch thick plate and angles. As mentioned, varying plate and angle thicknesses, and mounting assembly lengths are common, therefore, stress reductions other than as provided will vary accordingly.

| LOAD/BRKT(KIPS) | STRESS (KSI) DOA | STRESS DECREASE |
| --- | --- | --- |
| 1. Longitudinal (31.5) | 36 | 20% |
| 2. Vertical (35) | 36 | 65% |
| 3. Lateral (12) | 26.4 | 92% |

A second embodiment of the present invention is shown in FIG. 7. It is seen that the location of the drop-over bracket and the flat plate areas have been rearranged when compared to the preferred embodiment, although the respective surface areas of the drop-over brackets and the fiat plate areas have not been changed. As illustrated, instead of the forward and rearward ends 122′,124′ consisting of drop-over brackets, as with the preferred embodiment, they have been provided with flat plates 160′. As mentioned, it is preferable that, the summation of the individual areas of each flat plate 160′ be equal to the area of plate 160 in the preferred embodiment. In this way, the second embodiment will resist lateral and lateral overturn forces as effectively as with the preferred embodiment. However, it should be understood that the individual areas of each flat plate 160′ can be of non-equal area if it is necessary for one or both of the individual plates to clear appurtenances attached to the tractor. Minor changes in the total area will not affect the performance or the end results.

In a similar fashion, instead of the midsection 126′ being constructed as a flat plate section, it has been constructed as a single drop-over bracket 124′. The single drop-over bracket 124′ is preferably equal in longitudinal extent to the longitudinal extent of both of the individual drop-over brackets 140,142 in the preferred embodiment of FIG. 6. Because the surface areas of the flat plate and drop-over bracket assemblies from the preferred embodiment have been preserved in the second embodiment, it can be said that unitary, member 120′ functions equivalently to unitary member 120 of the preferred embodiment with respect to reducing longitudinal, vertical, lateral and lateral overturn loads.

In addition, it should be clear that in both embodiments, an inboard overhang 155 can laterally extend beyond inboard channel terminal edge 21 in a continuous fashion along the entire longitudinal length of unitary mounting assembly 120 or 120′. This is best seen from viewing FIG. 8 where it is seen that unitary overhang 155 allows an additional anchoring device 350 to be added to the fifth wheel mounting system, if desired. As illustrated, anchoring device 350 is a generally L-shaped structure that preferably is of one piece construction or it can consist of plate sections 351,353, welded together. Plate 351 is equal in thickness to channel horizontal leg 18 and has a horizontal extent equal to overhang 155. Plate 353 is at least the same thickness as plate 351, although it is preferable to be twice as thick in order to provide for throughbore 354. Bolt 200 and nut 205 are used to secure the overhang 155 of member 120 or 120′ to anchoring device 350. Anchoring device 350 provides additional bending resistance to the inboard side of unitary member 120 or 120′ to that already provided by each of the outboard support angle members 180 or 180′. Anchoring device 350 can also be either two separate members at each end of the unitary member or it can be one unitary piece extending the entire longitudinal span or length of unitary member 120 or 120′. Of course, if anchoring device 350 extended the entire longitudinal length of member 120′, more bolts would have to be used for securing the assembly to overhang 155.

The foregoing description has been provided to clearly define and completely describe the present invention. Various modifications may be made without departing from the scope and spirit of the invention, which is defined in the following claims.

What is claimed is:

1. A combination drop-over and flat plate fifth wheel mounting bracket arrangement mounted on a tractor frame having a pair of transversely spaced and longitudinally extending C-shaped channel members, each of said channel members having inboard facing top and bottom horizontal flanges extending from a vertical web, said web having an inboard face and an outboard face, each of said top and bottom horizontal flanges having outside surfaces which are defined by inboard and outboard terminal edges, said combination fifth wheel mounting bracket arrangement comprising:

a respective mounting member attached to each of said channel members, each of said mounting members having a forward end section, a rearward end section, and a midsection therebetween integral with each of said end sections, each of said end sections and said midsection defining a co-planar top surface therebetween, said top surface including an inboard and an outboard terminal edge and an arcuate mounting bracket attached therebetween for pinned securement of said arcuate mounting bracket to said fifth wheel, each of said forward and rearward end sections constructed as a drop-over bracket and said midsection constructed as a planar plate, each of said drop-over brackets defined by an L-shaped section of angle, said forward and rearward end sections having structural and operational equivalency;

at least one angle member having a longitudinal extent and comprised of a horizontal leg and a vertical leg connected to said horizontal leg, said vertical leg coextensive with at least part of said vertical web outboard face and attached thereto, said horizontal leg coextensive with said midsection of said mounting member and attached thereto:

wherein one of said midsection and said end sections prevents fatigue cracking of said fifth wheel mounting bracket arrangement caused by lateral and lateral overturn loads while the other of said midsection and said end sections prevents uplifting of said fitch wheel mounting bracket arrangement caused by longitudinal and coupling loads.

2. The fifth wheel mounting arrangement of claim 1 wherein said mounting member inboard terminal edge further includes an overhanging shelf, said overhanging shelf integral with and co-planar to said mounting member inboard terminal edge.

3. The fifth wheel mounting arrangement of claim 2, wherein each of said forward and rearward ends of said mounting member further includes an anchoring clamp for securement of said overhanging shelf to said channel member, said anchoring clamp longitudinally extending along said outboard terminal edge of said mounting member.

4. The fifth wheel mounting arrangement of claim 3 wherein said anchoring clamp is comprised of a first piece and a second piece, each of said pieces having a longitudinal extent equal to said respective forward and rearward end section planar plates.

5. The fifth wheel mounting arrangement of claim 1 wherein said arcuate mounting bracket is integrally cast as part of said mounting member to form a unitary mounting arrangement.

6. A combination drop-over and flat plate fifth wheel mounting bracket arrangement mounted on a tractor frame having a pair of transversely spaced and longitudinally extending C-shaped channel members, each of said channel members having inboard facing top and bottom horizontal flanges extending from a vertical web, said web having an inboard face and an outboard face, each of said top and bottom horizontal flanges having outside surfaces which are defined by inboard and outboard terminal edges, said combination fifth wheel mounting bracket arrangement comprising:

a respective mounting member attached to each of said channel members, each of said mounting members having a forward end, section, a rearward end section, and a midsection therebetween integral with each of said end sections, each of said end sections and said midsection defining a co-planar top surface therebetween, said top surface including an inboard and an outboard terminal edge and an arcuate mounting bracket attached therebetween for pinned securement of said arcuate mounting bracket to said fifth wheel, said midsection constructed as a drop-over bracket and each of said forward and said rearward end sections constructed as planar plates, said drop-over bracket defined by an L-shaped section of angle, said forward and rearward end sections having structural and operational equivalency;

at least one angle member having a longitudinal extent and comprised of a horizontal leg and a vertical leg connected to said horizontal leg, said vertical leg of each angle member respectively coextensive with at least part of said vertical web outboard face and attached thereto, said horizontal leg of each angle member coextensive with a respective said end section of said mounting member and respectively attached thereto;

wherein one of said midsection and said end sections prevents fatigue cracking of said fifth wheel mounting bracket arrangement caused by lateral and lateral overturn loads while the other of said midsection and said end sections prevents uplifting of said fifth wheel mounting bracket arrangement caused by longitudinal and coupling loads.

7. The fifth wheel mounting arrangement of claim 6 wherein said mounting member inboard terminal edge further includes an overhanging shelf, said overhanging shelf integral with and co-planar to said mounting member inboard terminal edge.

8. The fifth wheel mounting arrangement of claim 7 wherein each of said forward and rearward ends of said mounting member further includes an anchoring clamp for securement of said overhanging shelf to said channel member, said anchoring clamp longitudinally extending along said inboard terminal edge of said mounting member.

9. The fifth wheel mounting arrangement of claim 8 wherein said anchoring clamp is comprised of a first piece and a second piece, said first piece located at said forward end section and said second piece located at said rearward end section.

10. The fifth wheel mounting arrangement of claim 6 wherein said arcuate mounting bracket is integrally cast as part of said mounting member to form a unitary mounting arrangement.

11. A combination drop-over and flat plate fifth wheel mounting bracket arrangement for a tractor frame having a pair of transversely spaced and longitudinally extending C-shaped channel members and a fifth wheel mounted therebetween, said combination fifth wheel mounting bracket arrangement comprising:

a respective mounting member attached to each of said channel members, each of said mounting members having a forward end section, a rearward end section, and a midsection therebetween integral with each of said end sections, each of said end sections and said midsection defining a co-planar top surface therebetween, said top surface including an inboard and an outboard terminal edge and an arcuate mounting bracket attached therebetween for pinned securement of said arcuate mounting bracket to said fifth wheel, each of said forward and rearward end sections constructed as a drop-over bracket and said midsection constructed as a planar plate, each of said drop-over brackets defined by an L-shaped section of angle, said forward and rearward end sections having structural and operational equivalency;

at least one angle member having a longitudinal extent and comprised of a horizontal leg and a vertical leg connected to said horizontal leg, said vertical leg for attachment to said channel member, said horizontal leg for attachment to said midsection of said mounting member.

12. A combination drop-over and flat plate fifth wheel mounting bracket arrangement for a tractor frame having a pair of transversely spaced and longitudinally extending C-shaped channel members and a fifth wheel mounted therebetween, said combination fifth wheel mounting bracket arrangement comprising:

a respective mounting member attached to each of said channel members, each of said mounting members having a forward end section, a rearward end section, and a midsection therebetween integral with each of said end sections, each of said end sections and said midsection defining a co-planar top surface therebetween, said top surface including an inboard and an outboard terminal edge and an arcuate mounting bracket attached therebetween for pinned securement of said arcuate mounting bracket to said fifth wheel, said midsection constructed as a drop-over bracket and each of said forward and said rearward end sections constructed as planar plates, said drop-over bracket defined by an L-shaped section of angle, said forward and rearward end sections having structural and operational equivalency;

at least one angle member having a longitudinal extent and comprised of a horizontal leg and a vertical leg connected to said horizontal leg, said vertical leg of each angle member for attachment to said channel member, said horizontal leg of each angle member for attachment to said end sections of said mounting member.

* * * * *